F. I. L. BYLGER.
ROTARY ENGINE.
APPLICATION FILED APR. 10, 1911.

1,091,806.

Patented Mar. 31, 1914.

WITNESSES:

INVENTOR

BY
ATTORNEY

F. I. L. BYLGER.
ROTARY ENGINE.
APPLICATION FILED APR. 10, 1911.

1,091,806.

Patented Mar. 31, 1914.
5 SHEETS—SHEET 3.

WITNESSES

INVENTOR

BY

ATTORNEY

F. I. L. BYLGER.
ROTARY ENGINE.
APPLICATION FILED APR. 10, 1911.

1,091,806.

Patented Mar. 31, 1914.
5 SHEETS—SHEET 4.

F. I. L. BYLGER.
ROTARY ENGINE.
APPLICATION FILED APR. 10, 1911.

1,091,806.

Patented Mar. 31, 1914.
5 SHEETS—SHEET 5.

WITNESSES

INVENTOR
Frans Ivar L. Bylger
BY
Alan M. Johnson
ATTORNEY

UNITED STATES PATENT OFFICE.

FRANS IVAR L. BYLGER, OF NEW YORK, N. Y.

ROTARY ENGINE.

1,091,806.  Specification of Letters Patent.  Patented Mar. 31, 1914.

Application filed April 10, 1911. Serial No. 620,079.

*To all whom it may concern:*

Be it known that I, FRANS IVAR L. BYLGER, a citizen of the United States, and a resident of New York, in the county of New York and State of New York, have invented new and useful Improvements in Rotary Engines, of which the following is a specification.

This invention relates to rotary engines which are actuated by any suitable fluid under pressure such for instance as steam, water, or any other suitable fluid, and also relates to rotary explosion engines.

In the accompanying drawings I have shown illustrative embodiments of my invention, in which the same reference numerals refer to similar parts in the several figures.

Fig. 6ᴬ is a detail view.

In the illustrative embodiment of my invention, 1 is a power shaft which is driven by my improved rotary motor or preferably by a pair or pairs of such motors, only one pair being shown in the drawing, but it is to be understood that either one motor, a pair of motors, or any multiple of them may be used.

Figure 1:
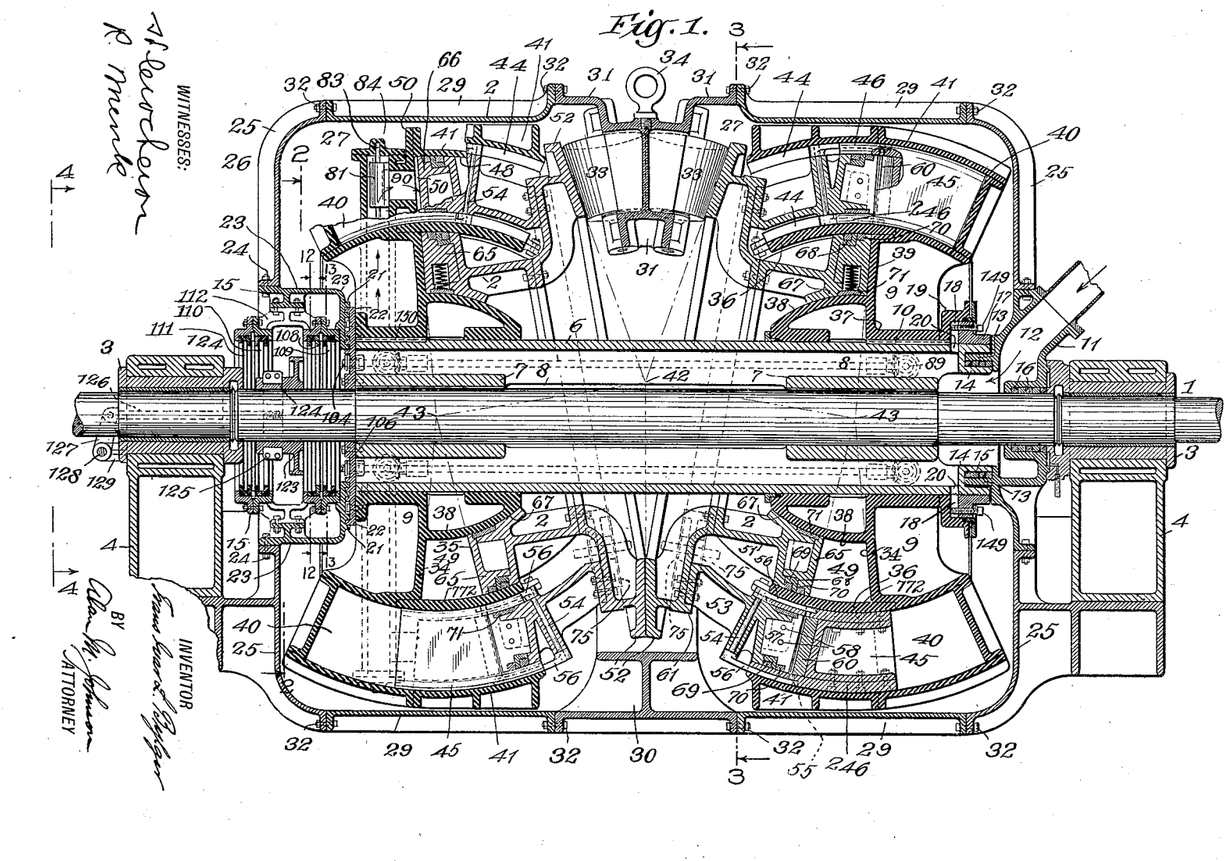
Figure 1 is a vertical section showing two of my rotary engines connected to drive the same power shaft.
Figures 4, 5, 6, 6A:
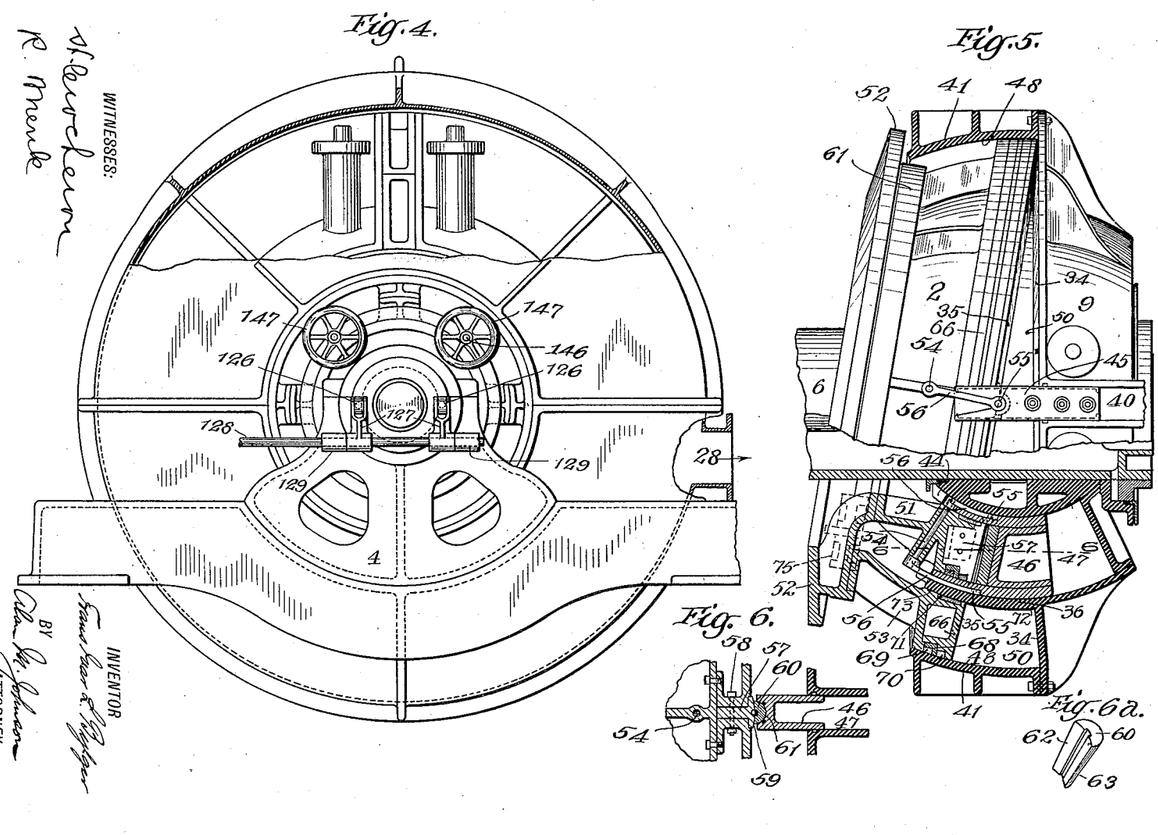
Fig. 4 is an end elevation, partly broken away, taken on the line 4—4 of Fig. 1, looking in the direction of the arrows.
Fig. 5 is a section taken substantially on the line 5—5 of Fig. 2, some parts being shown in plan and certain parts being omitted for purposes of illustration.
Fig. 6 is a detail horizontal section taken substantially on the line 6—6 of Fig. 5.
Figure 12:
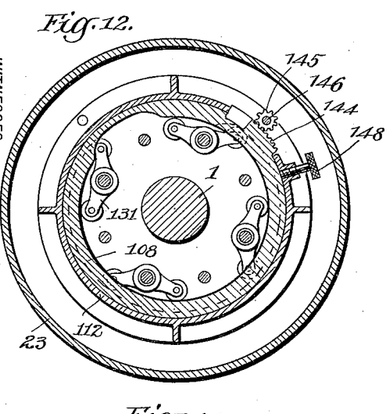
Fig. 12 is a vertical section substantially on the line 12—12 of Fig. 1.
Figures 13, 18:
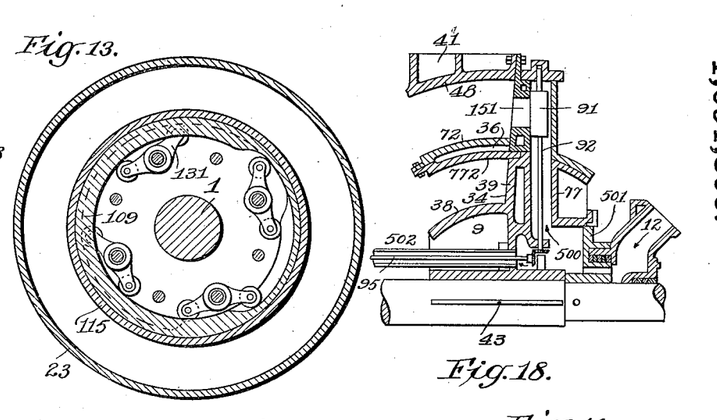
Fig. 13 is a vertical section substantially on the line 13—13 of Fig. 1.
Fig. 18 is a fragmentary, vertical longitudinal section illustrating a modified form of my invention.
Figure 14:
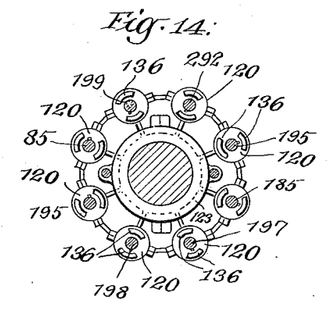
Fig. 14 is a detail side elevation of a portion of the reversing mechanism, its supporting shaft being shown in section.

My rotary motor includes essentially a main rotor or impulse wheel 9, Figs. 5 and 1, and a secondary conical rotor 2, Figs. 1 and 5, the former for clearness of illustration being shown in Fig. 1 in heavier hatching than the latter. The secondary conical rotor 2 is mounted on the main rotor 9 in a manner to be hereinafter more fully pointed out. This main rotor 9 may be mounted in various ways so as to drive the power shaft 1. It may, for example, be mounted directly on the power shaft, as shown in Fig. 18, but preferably it is mounted on a hub or cylinder 6, through which the power shaft 1 passes. When a cylinder is used, which is the preferred construction, I provide it with hollow bearings 7, 7 in which is mounted the power shaft 1 and which are connected to the cylinder by the webs 8, 8, Fig. 2. The main rotor or impulse wheel 9, of the right hand motor shown in Fig. 1 is mounted in any suitable manner on the cylinder 6. Preferably, for reasons which will later be pointed out, I connect the hub portion 37 of the main rotor 9 with the cylinder 6 by means of a spline 10, Fig. 1.

Each main rotor comprises a conical portion 39, a central spherical portion or bearing surface 38, a shell 41 having a concave spherical bearing surface 48, and a partition 36 having convex and concave bearing surfaces numbered, respectively 72 and 772. Each main rotor is also provided with pockets 40 and 47 to receive the vanes or blades 45 and 46, to be hereinafter described, and with grooves 44 in the spherical shell 41, the spherical partition 36, and the portion 38 to act as guides for the outer and inner portions 246 of the vanes or blades 45 and 46. The spherical surfaces 38, 772, 72 and 48 are concentric and their center coincides with the apex of the cone, in the surface of which lies the conical bearing surface 34 of the conical portion 39 of the main rotor. Each secondary rotor, which will be hereinafter described in detail, has a conical bearing surface 35 rolling in contact with the conical bearing surface of the main rotor, the apex of the cone of which this surface is a part also coinciding with the point 43. The two cones are similar, so that when the conical bearing surfaces of the main and secondary rotors roll one upon the other, the two rotors will travel at the same speed. By means of the spherical partition 36 the space between the interior surface 48 of the spherical bearing shell 41 and the exterior surface of the spherical bearing 38 is divided into independent ring shaped working chambers, the inner one being designated 49 and the outer one 50, Figs. 1, 5 and 15. Though my rotary motor will operate with merely one pocket 40 and one vane or blade 45 in one working chamber 50, I preferably use two working chambers 49 and 50 and four pockets 47 and 40 with four vanes or blades 46 and 45. In the outer working chamber 50 I arrange two of these pockets 40, in which work the main vanes 45 (see Fig. 15). These pockets are preferably located 180 degrees apart. In the inner working chamber I mount inner vanes or blades 46 working in corresponding pockets 47. These inner vanes and pockets are substantially the same as the outer ones and are preferably but not necessarily located 90 degrees therefrom. With each of these main rotors or impulse wheels 9, a secondary conical rotor 2 (Figs. 1 and 5) coöperates, which, as previously noted, is in Fig. 1, illustrated in section with hatching somewhat lighter than that of the main rotor 9.

The principal features of each secondary rotor 2 are, the ring shaped portions 65 and 66 which fit the working chambers 49 and 50 and the faces of which lie in the same conical surface 35, a ring with conical face plate 52, a cylindrical face 61, and the ring shaped portions 51 and 53 connecting 52 and 65 and 66. As above noted, the apex of the conical surface 35 is at the point 43. The apex of the conical surface of the face plate 52 is at 42. The secondary rotor 2 rotates on an axis passing through points 42 and 43. A flexible as well as fluid tight connection is required between the different inner and outer blades or vanes and the secondary rotor 2. To accomplish this I employ any suitable flexible means to connect the blades or vanes with the secondary rotor 2. I may for example mount a pivoting pin 54 on the secondary rotor 2 and pins 55, 55 on the blades or vanes. I connect these pins 55, 55 with the ends of the pivoting pin 54 by means of links 56, 56. It is understood that the axes of the pivoting pin 54 and of the pins 55, 55 co-incide with lines passing through the point 43.

I secure a tongue 57 in any suitable manner to the secondary rotor 2 as by means of the bolts 58, Figs. 5 and 6. This tongue 57 is provided with a conical head 59, its axis being on the center line of the pin 54 and its apex at 43. Between the conical head 59 and the blade or vane, I mount a floating conical member 60, mounting it in the concave portion 61 of the blade or vane. This member 60 has a conical concave surface 62 to contact with the conical head 59 and a convex cylindrical surface 63 which coöperates with the concave seat 61 in the blade or vane.

The portions shown in section in Fig. 5 and Fig. 6 show the connection between the secondary rotor and one of the inner blades or vanes. The connection between the secondary rotor 2 and the outer blades or vanes, which are preferably arranged 90° from the inner blades or vanes, is exactly the same, the links for the outer vanes being shown in Fig. 5. Suitable packings, such for instance as those shown, comprising rings 68 and packing rings 69 and 70 are also carried by the secondary rotor 2 these packings coöperating with and bearing upon the interior surfaces of the spherical shells 41 and 36. Packing rings 71 are also preferably mounted in the spherical bearing surfaces 67 and 73 of the secondary rotor 2 so as to prevent the escape of steam or other operating fluid between the spherical surfaces 67 and 38, or at surfaces 72 and 73.

Figure 3:
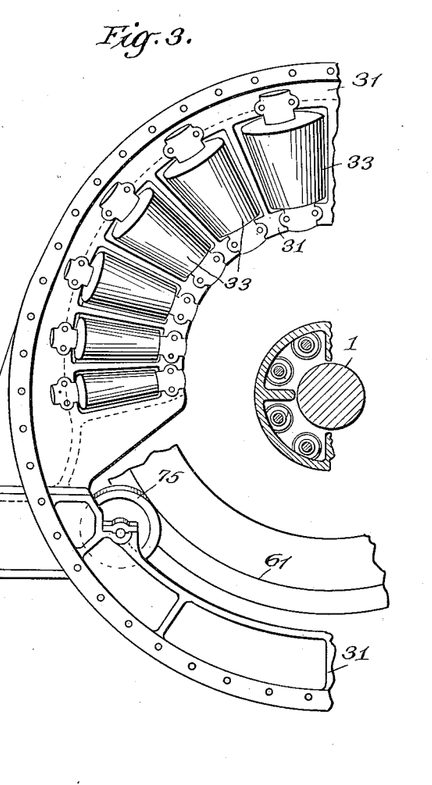
Fig. 3 is a vertical section substantially on the line 3—3 of Fig. 1, looking in the direction of the arrows, some portions of the mechanism being shown in side elevation.
Figure 19:
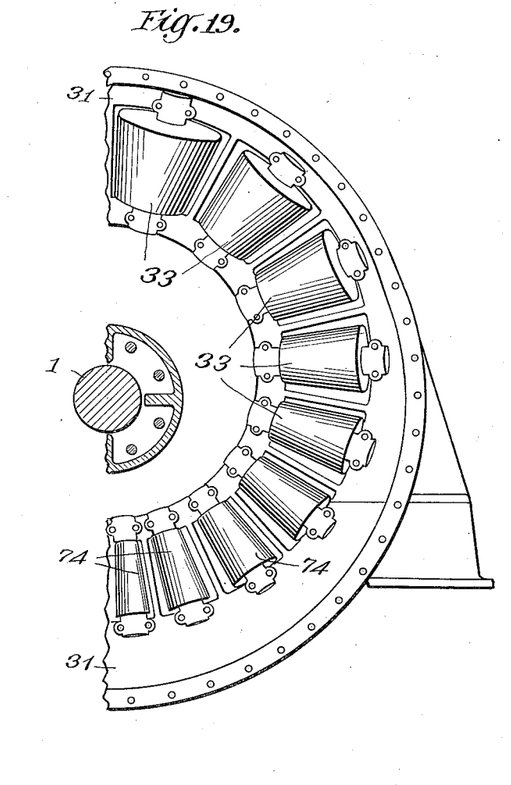
Fig. 19 is a side elevation partly in section of a modification.

I preferably use my motors in pairs, arranging the conical face plates 52, 52 of the secondary conical rotors facing each other. Generally, the lower portions of the conical face plates 52, 52 are allowed to touch and roll upon each other Fig. 1, while their other portions are separated by conical rollers 33, 33 which bear upon each other and upon the conical face plates 52, 52 to transmit the lateral strain of one of the secondary conical rotors 2 directly to the opposed secondary conical rotor 2 of the complementary motor. These conical rollers 33 are preferably mounted in a frame 31, Figs. 1 and 3. If desired, a greater number of conical rollers 33 may be employed, gradually decreasing in diameter to entirely separate the two conical plates 52, as shown for example in the modification in Fig. 19, the small conical rollers 74 preventing the conical surfaces 52 from contacting with each other, in any portion of their rotation. The main rotor or impulse wheel 9 of the left hand motor, Fig. 1, is secured fast on the cylinder 6 by any suitable means such as by a key 150, so that this main rotor, unlike the one on the right of Fig. 1, has preferably no longitudinal movement on the cylinder 6.

The power or driven shaft 1 on which are mounted the motors, either directly, or through the intermediate cylinder 6, is supported in any suitable manner as for example by means of the bearings 3, 3 carried by the standards 4, 4. The ends of this cylinder 6 are closed in any suitable manner, one end being closed by the plate 22. For purposes of illustration I have shown circular tongues and grooves 21, mounted on the plate 22, Fig. 1, to prevent air from entering the casing 26 should a vacuum be maintained therein, or to prevent any of the exhaust from leaking or escaping from the casing 26 should the pressure therein be above atmospheric pressure. Some of the tongues and grooves 21 are on the rotating plate 22, while others are on the fixed plate 23. This fixed plate 23 is held immovable, in any suitable manner, such as by the bolts 24, 24, Fig. 1, securing it to the end members 25 of the casing 26 which preferably entirely surrounds both of the rotary engines and forms an exhaust chamber 27 into which the steam may be exhausted, later passing out through any suitable outlet such as 28, Fig. 4, where it may pass into the atmosphere or be later condensed and re-used as found convenient or expedient. This casing in addition to the end members 25, 25 includes the cover plates 29, 29, the standard 30 and the frame 31, all of which are suitably secured together by means of the bolts 32, 32 or any other suitable means. The other end of the cylinder 6 is closed (except for an inlet for the operating fluid) by means of a casting 11 having an inlet port 12 and a flange 13 which coöperates with a ring 14 carried by the cylinder 6, a suitable stuffing box 15 being interposed to prevent the passage of steam or other operating fluid. A stuffing box 16 is also employed to prevent the steam or other operating fluid escaping around the shaft 1. On one end of the cylinder 6, for example the right hand end illustrated in Fig. 1, I secure a ring 17, leaving a small chamber 18 between it and a ring 19 which is mounted to have a limited lateral movement on the cylinder 6, as for example, by being splined on the spline 10. By this arrangement a portion of the steam or other operating fluid will flow into this chamber 18 through ports 20, 20 in the cylinder and cause the ring 19 to move laterally, which in turn will cause the main rotor or impulse wheel 9 to move laterally on its spline 10 toward its complementary motor to take up any slackness there might be between the conical surfaces 34 and 35.

In addition to, or in place of, the chamber 18 I may, in some cases use adjusting screws 149, 149, Fig. 1, to adjust one motor to its complementary one and also to maintain the rotors of each motor in contact.

I preferably provide wheels or rollers 75, 75 on the stationary frame or casing, to prevent the pressure of the operating fluid on the conical surface 35 of the secondary rotor 2, which is unequally distributed over said surface, being greatest upon the upper portion of said surface between the line of contact of the conical surface of the secondary rotor with the conical surface of the main rotor and the point of cut-off, from crowding the secondary rotor 2 from its true axis of rotation and also to transmit, very largely, the weight of the secondary rotor 2 directly to the stationary frame.

For conducting the operating fluid to the working chambers of the motor and for governing the admission and the exhaust of the fluid into and from said chambers, I use any suitable construction, preferably that illustrated in Figs. 1, 2, 4, 7, 8, 9, 10, 11, 12, 13, 14, 15, 16 and 17, and now to be described in detail. The operating fluid entering the cylinder 6 through the inlet 12 passes through the valve chambers in the hollow bosses 76, 77, 78 and 79 to the outer working chamber 46, entering the same through certain of the ports 90, 151, 152 and 153, as will be hereinafter explained. The inner working chamber 49 is supplied through the valve chambers in the hollow bosses 96, 97, 98 and 99, and the appropriate ports 154, 155, 156 and 157, also as will be hereinafter explained. In the valve chamber in each of these hollow bosses is mounted a rotary valve carried upon a valve stem, the valves in bosses 76, 77, 78 and 79 being numbered, respectively, 81, 91, 158 and 159; and the valves in bosses 96, 97, 98 and 99 being numbered 105, 160, 161 and 162, respectively. Means are provided for rocking the valve stems and valves about their axes, as will be hereinafter fully described. Each of the hollow bosses is provided with a port 163 opening into the exhaust chamber 27, and through which exhaust from the working chambers may take place when the valves are appropriately positioned by their operating mechanism.

To admit steam, or other operating fluid to the motor, the valves 81, 91, 158 and 159, Figs. 2, 16 and 17, controlling the inlet and exhaust for the outer ring shaped chamber 50 are operated in a manner to be hereinafter described, as are also the valves 105, 160, 161 and 162 controlling the inlet and exhaust for the inner ring shaped chamber 49, one of each pair of valves operating as an inlet valve, while the corresponding one of that pair is either closed or acts as an exhaust valve.

Figures 15, 16, 17:
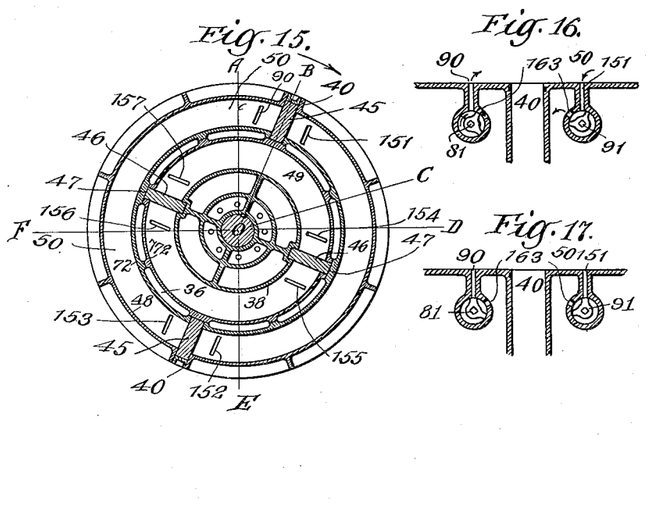
Fig. 15 is a sectional diagrammatic view, showing the arrangement of vanes or blades and ports.
Fig. 16 is a sectional detail view showing one valve at full inlet and the corresponding valve at full exhaust.
Fig. 17 shows a pair of valves in their cut off position.

With particular reference to Fig. 15, it will be assumed that the line O A represents the line of contact or closing line of the main rotor 9 and the secondary conical rotor 2 which form the inner and outer ring shaped chambers 49 and 50, respectively into which the steam or other operating fluid is admitted. From this line O A the main rotor 9 and the secondary conical rotor 2 separate, reaching their maximum separation on the line O E, and from that line back to O A, the two rotors 9 and 2 again approach each other until they meet on the line O A when on the next rotation they again follow the cycle just described. This approaching to and receding from each other of the main rotor 9 and secondary conical rotor 2 causes the inner and outer blades or vanes 46, 46 and 45, 45, respectively, to move in and out of their respective pockets 47, 47 and 40, 40. Assuming that the motor is operating in the direction indicated by the arrow, Fig. 15, when the outer vane 45, (illustrated on the upper portion of Fig. 15) has passed the line O—A and is substantially on the line O—B, the valve for port 90 begins to open and to admit steam or other operating fluid behind this vane or blade 45. At this same period the valve controlling the port 151 is closed. Steam or other operating fluid is continuously admitted through the port 90 until the vane or blade 45 reaches substantially the line O—C, Fig. 15, when the inlet is cut off by operating the valve for port 90 in a manner to be hereinafter described. During this movement the ports 151 and 152 are closed and the steam previously admitted through 152 is expanding and still doing effective work on the lower vane or blade 45, for at this period the exposed area of this lower blade 45 is greater than that of the upper vane or blade 45. This is also true of the action of the operating fluid on the inner blade or vane 46. The exhaust is commenced when the upper vane or blade, Fig. 15, substantially reaches the line O—D, the ports 151, 153 being open to permit the exhaust steam, for example, to pass into the casing surrounding the motors and thence out through the exhaust port 28, Fig. 4. This exhaust through the ports 151 and 153 continues until the port 153 reaches line O—A when the exhaust through port 153 is stopped until the outer vane or blade again reaches the line O—D. The exhaust through port 151 continues until the port reaches the line O—A, when the port is closed, it remaining closed until the upper face again passes the line O—D. The steam, or other operating fluid, is admitted into the inner ring shaped chamber 49 in the same manner through the ports 154 and 156, these ports opening and closing the same as described for the ports 90 and 152, controlling the admission of the operating fluid to the outer chamber 50. The valves for the inner ring shaped chamber 49 and the outer ring shaped chamber 50 do not operate in unison for the inner and outer vanes or blades are 90° apart, therefore one inner or outer blade is one quarter of a revolution ahead or behind the corresponding blade or vane for the other ring shaped chamber as the case may be. Therefore, the valves controlling the ports 90, 154, 152 and 156, Fig. 16, will be operated successively to admit the supply of the operating fluid to the respective inner and outer ring shaped chambers 49 and 50. Likewise the valves controlling the ports 151, 155, 153 and 157 will be operated successively to permit the exhaust from the inner and outer chambers 49 and 50, respectively, to pass into the casing surrounding the motors.

When I employ reversing mechanism to reverse the direction of rotation of the motors, operation of the valves and ports are reversed. That is, on reversing, the valves are operated, in a manner to be hereinafter described, so that the ports 151 and 153 for the outer ring shaped chamber 50 and the ports 155 and 157 of the inner ring shaped chamber 49 are used as inlet ports, and the other ports 90 and 152 of the outer ring shaped chamber 50 and the ports 154 and 156 of the inner ring shaped chamber 49 are used as the exhaust ports. It is to be understood, however, that my invention covers an engine which is always required to run in one direction, as well as an engine which is to be reversed.

Preferably, as previously noted, I arrange my motors in pairs. Each motor can be composed of any desirable number of ring shaped compartments or chambers, preferably two, an inner one 49 and an outer one 50 as shown, each ring shaped member being provided with one or more blades or vanes 45 or 46 as the case may be, two vanes being preferably mounted to coöperate with each of the inner and outer compartments or ring shaped chambers and are preferably arranged 180° apart as shown. In the preferred construction it will therefore be seen that the motor receives four impulses on each revolution. It will also be clear that while a vane or blade and pocket passes the line on which the main rotor 9 and the secondary conical rotor 2 touch, the proper relation for the main and conical rotors to roll one against the other, is still maintained as the blades are staggered. This is the case as portions of the conical bearing surfaces of the two rotors will always be in contact. While one of the outer vanes is passing the line of contact, the conical surfaces of the rotors inside of the partition will be rolling in contact, thus preventing any displacement of the rotors or jar, and vice versa.

The different valves may be mounted in various ways. As above noted I preferably mount the valves 81, 91, 158 and 159 for the outer ring shaped chamber 50 in the hollow bosses 76, 77, 78 and 79, respectively, the valves 105, 160, 161 and 162 controlling the inlet and exhaust into the inner ring shaped chamber 49 being similarly mounted in the hollow bosses 96, 97, 98 and 99, respectively, Fig. 2. The valve 81 has a valve stem 82 provided at one end with a bevel or similar gear 86 which meshes with a bevel gear 87 mounted on the valve shaft 85. The valve stem 92 of the valve 91 is likewise provided with a bevel gear 93 in mesh with a gear 94 carried by the valve shaft 95. The valve stem 184 of the valve 158 is likewise provided with a bevel gear 186 in mesh with a gear 187 carried by the valve shaft 185. The valve stem 192 of the valve 159 is likewise provided with a bevel gear 193 in mesh with a bevel gear 194 mounted on the valve shaft 195. The inner valves 105, 160, 161 and 162 have their respective valve stems 188, 189, 190 and 191 also connected to the respective valve shafts 292, 197, 198 and 199 by means of similar bevel gears so that rocking or partial rotation of the valve shafts will actuate the valve stems to operate the valves. When my rotary engines are used in pairs as shown in Fig. 1 I mount upon each of the valve shafts 85, 95, 185 and 195 additional bevel gears to coöperate with similar bevel gears carried by the valve stems of the valves mounted on the second engine to control the outer valves. Likewise the valve stems of the inner valves of the second motor are connected by similar bevel gears to the valve shafts 292, 197, 198 and 199. By this arrangement whenever one of the valve shafts is rocked or partially rotated, it, through the respective bevel gears, will operate corresponding valves on each of the motors, if they are used in pairs which is the preferred construction.

The valves for driving and reversing the rotation of the motors may be operated in various ways. For purposes of illustration, but with no idea of limiting my invention to the specific feature of it, I use a series of fixed cams 108, 109, Figs. 1, 9, 12 and 13, for controlling the valves in the normal operation of the engine, and fixed cams 110 and 111 in reversing the valves so as to reverse the engine. These fixed cams may be mounted in any suitable position on the frame or casing. To permit ready access to them and to the cam followers with which they coöperate, without removing any portion of the casing, I mount them within the fixed plate 23 which is here shown as cupped and opened to the atmosphere, permitting ready inspection and adjustment of the cams and cam followers, if desired.

Figures 2, 7, 8, 9, 10, 11:
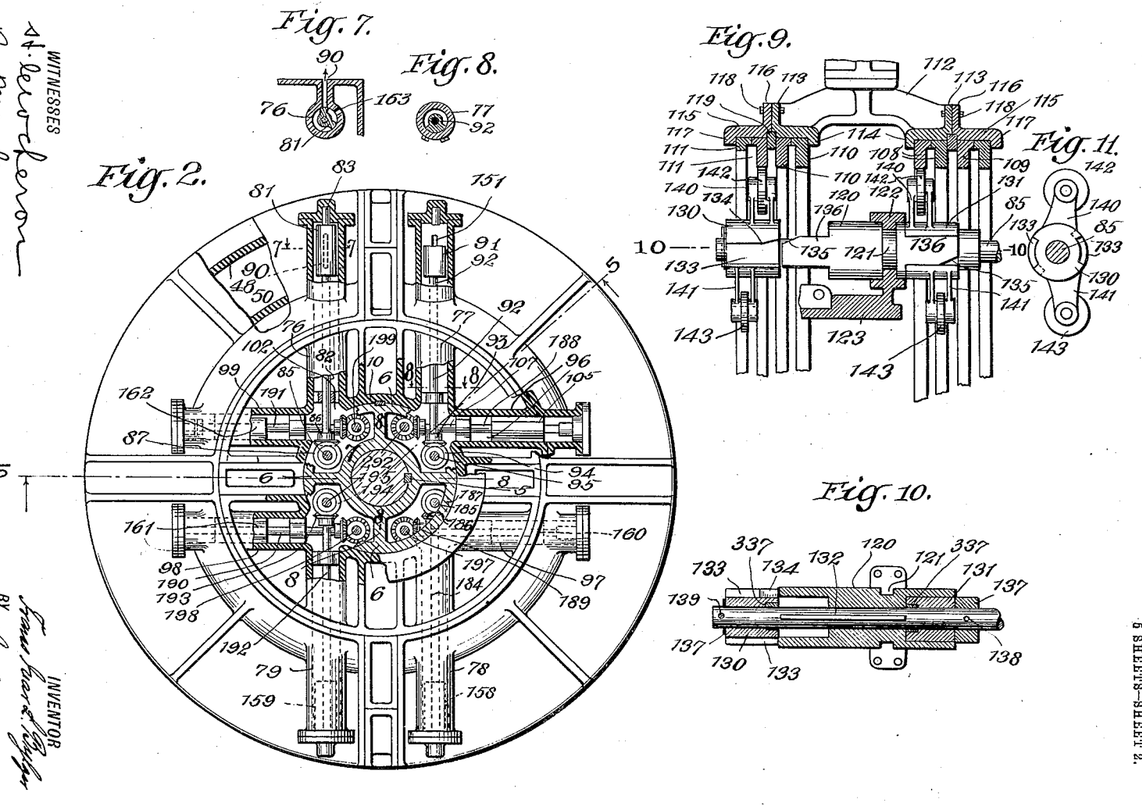
Fig. 2 is a vertical section substantially on the line 2—2 of Fig. 1, showing a portion of the mechanism in side elevation and a portion partly broken away for purposes of better illustration.
Fig. 7 is a horizontal detail section substantially on the line 7—7 of Fig. 2.
Fig. 8 is a horizontal detail section on the line 8—8 of Fig. 2.
Fig. 9 is a detail vertical section on an enlarged scale, showing portions of the valve driving and reversing mechanism.
Fig. 10 is a horizontal section taken on the line 10—10 of Fig. 9.
Fig. 11 is a detail view in side elevation of one of the loose arms, the valve shaft being shown in section.

Mounted within the fixed plate 23, in any suitable manner, so as to prevent its rotation, is a body member 112, Figs. 1 and 9, having two upwardly extending flanges 113, 113, and two downwardly extending flanges 114, 114. On each of the flanges 113 I secure a ring 115 having an upwardly extending flange 116 and a downwardly extending flange 117. The respective flanges 116 and 113 are secured together in any suitable manner, such as by means of bolts 118. Between the two flanges 114 and 117 I mount the fixed cams 108, 109, 110, and 111, plates 119, 119 being preferably used to space the cams, Fig. 9. Cams 108 and 109 are the cams controlling the normal forward rotation or drive of the engine. The reverse cams are the cams 110 and 111.

Each of the several valve shafts 85, 95, 185 and 195 controlling the outer valves as well as the inner valve shafts 292, 197, 198 and 199 controlling the inner valves is provided with two loosely mounted cam followers 130 and 131, Figs. 9, 10 and 11. Between each pair of cam followers is mounted a clutch 120, which is connected to the shaft by means of a spline 132, Fig. 10. Each one of these cam followers 130 and 131 is provided with a groove 133 which is preferably provided on the side nearest the clutch with an inclined or wedge surface 134 to coöperate with the inclined surface 135 on the respective clutch arms 136, 136 of the clutch 120. These cam followers 130 and 131 are secured on the different shafts by any suitable means such as by the washers 137, secured on the axle by pins 138 and by means of cotter pins 139, Fig. 10. They are prevented from moving toward each other by any suitable means such as by having the spline 132 properly space them, the ends of the spline being engaged by the collars 337. The clutch arms 136 are of such length that they cannot securely lock both the cam followers 130 and 131 at the same time. Each of the cam followers 130 and 131 is provided with offset fingers 140 and 141 carrying respectively, rollers 142 and 143. These fingers and rollers are so arranged with relation to the cams that when one roller 143, for example, would fail to pass into the cut out portion of the fixed cam, the other roller 142 riding up an enlarged portion of the complementary fixed cam would cause the roller 143 to positively follow the outline of its cam should friction or any other cause tend to prevent its proper operation. In Figs. 9 and 10, the cam follower 131 is shown locked to the clutch 120 so that as this entire mechanism is rotated within the cams 108 and 109, the rollers would cause the shaft 85, for example, to rock in a certain direction while the other cam follower 130 would rock idly upon the same shaft without actuating it. In the position of the parts shown, the clutch is causing the valve shaft 85 to rock in a direction which through its connected valve stems and valves will drive the engine in its normal direction. Upon rocking the shaft 128, Figs. 1 and 4, the shifting collar 123 with its respective clutches 120, which in the device shown would number eight, Fig. 14, will be caused to move to the left of Fig. 9 and release the cam follower 131, the clutch arm 136 of the clutch 120 will then coöperate with the slot 133 in the other cam follower 130 and in this manner lock this cam follower 130 to the same shaft 85, and thereby through different and oppositely cut fixed cams 110 and 111 reverse the rocking of this shaft 85 and consequently the valve stems connected with it.

Of course, it is to be understood that I may omit the cam followers 130 when I do not desire to have a reversing engine. When I use a reversing engine I employ four sets of cams and two cam followers for each valve shaft, as noted. In this case, as already described, the cam followers are loosely mounted on the valve shafts and one or the other coupled to its shaft by means of a clutch 120 which is mounted between the cam followers and the shaft by means of a feather or spline 132. To swing the valves to the desired position, preliminary to coupling the valve shafts to another set of cam followers, the clutch arms 136, 136 on the clutches 120 are made wedge shaped and the grooves in the hubs of the cam followers are correspondingly formed, as noted. It will be seen that the cam followers are held by the cams and consequently if the wedge shaped clutch arms 136, 136 and cam followers are forced together by means of the shifting collar the valve shafts swing with the splined clutch 120 as long as the wedge shaped portions of the clutch arms contact with the particular cam follower. The coupling is then done by completing the throw of the shifting collar. As the valves move back and forth from inlet to cut off, or from exhaust to cut off, dependent upon the direction of rotation, the maximum movement of a valve preliminary to clutching would be from full inlet to full exhaust or vice versa. For certain positions of the rotors a valve may stand at cut off for both directions of rotation in which case the wedge shapes would not come into play. Any intermediate positions will be readily understood.

In some cases, though not necessarily, I mount the cams so that they can be adjusted within the body member 112 and the rings 115. This will permit better control and regulation of the admission and expansion of the steam or other fluid within the respective main expansion chambers 50 and auxiliary expansion chambers 49. This may be done in various ways. For example, in the embodiment of my invention shown, a segmental rack 144, Fig. 12, may be formed on one of the cams and be permitted to mesh with a pinion 145 carried on the shaft 146 which is operated by a hand wheel 147, Fig. 4. As indicated in Fig. 4 a similar hand wheel 147 controls a pinion meshing with a similar rack (not shown) on one of the other cams. After the cam has been adjusted by means of the hand wheel 147, it can be locked in its position by a set screw 148, Fig. 12, which bears upon the periphery of the cam and prevents its accidental movement, until it is again desired to adjust it.

In some cases I may dispense with the hollow cylinder 6 and mount the main rotors 9, 9 directly on the drive shaft 1, as previously noted. In this case pipes or any other suitable connections supply the operating fluid directly from the inlet to the different inner and outer valves. Such a construction is illustrated in Fig. 18, in which the main rotor or rotors 9 are mounted directly upon the main shaft 1. In general, the construction of these rotors is the same as that already described, and will not therefore be set forth in detail. The steam or other operating fluid enters the inlet 12 and passes into the chamber 500, which is formed by parts of the main rotor and by the head 501 secured to the main shaft. The steam passes from this chamber into the valve chambers formed in the hollow bosses 77, etc., to the several ports opening into the working chambers. If a plurality of main rotors are used, as in the form of my invention shown in Fig. 1, the operating fluid is conducted to the second rotor through pipes 502 through which the valve shafts may be passed, if desired.

This case is a continuation of my application Serial Number 573,880, filed July 26, 1910, as to the general constructional features of the invention disclosed, but the engine disclosed herein is improved in many important particulars over that shown in my said earlier application.

Having thus described this invention in connection with the illustrative embodiments thereof, to the details of which I do not desire to be limited, what is claimed as new and what it is desired to secure by Letters Patent is set forth in the appended claims.

I claim—

1. In a rotary engine, in combination, a plurality of rotors rolling in contact, and an inclosing shell carried by and rotating with one of said rotors and inclosing a working space between said rotors.

2. In a rotary engine, in combination, a plurality of rotors having surfaces rolling in contact, one of said rotors carrying an inclosing shell, a working chamber being formed between said rotors, the walls of which comprise portions of the rolling surfaces of said rotors and of the inner surface of said inclosing shell.

3. In a rotary engine, in combination, a pair of rotors having conical faces rolling in contact, and an inclosing shell carried by and rotating with one of said rotors and inclosing the space between said conical faces.

4. In a rotary engine, the combination of a pair of rotors having a working chamber between them, the side walls of which comprise surfaces of the rotors rolling in contact, a blade or vane carried by said rotors and dividing said working chamber transversely, said rotors having a second pair of bearing surfaces rolling in contact, said second surfaces being continuous and unbroken adjacent to that part of the circumference of the rotors where said blade or vane is located.

5. In a rotary engine the combination of a main rotor, a secondary rotor rolling in contact with the main rotor, a plurality of concentric ring shaped chambers or compartments between the main and secondary rotors and a plurality of blades or vanes for each chamber or compartment, the vanes or blades for one compartment being arranged at different points circumferentially of the rotors from the vanes or blades for another compartment all of the vanes or blades being carried by and rotating with the rotors.

6. In a rotary engine, the combination of a pair of rotors having a plurality of annular working chambers between them, the side walls of each of which comprise surfaces of the rotors rolling in contact, blades or vanes carried by said rotors and dividing said working chambers transversely, the blades or vanes in different chambers being located at different circumferential points, the bearing surfaces in one chamber being continuous adjacent to the blade or vane in another chamber.

7. In a rotary engine the combination of a main rotor having one or more outer pockets and one or more inner pockets, a secondary rotor adapted to coöperate with the first rotor and provided with one or more outer blades or vanes to coöperate with the outer pockets of the main rotor and with one or more inner blades or vanes to coöperate with the inner pockets of the main rotor, a pair of concentric ring-shaped working chambers being formed between said rotors, one of which is crossed by the outer vane or vanes and the other by the inner vane or vanes.

8. In a rotary engine the combination of a main rotor provided with one or more outer pockets and one or more inner pockets, arranged at an angle to the outer pockets, a secondary rotor to coöperate with the main rotor, one or more outer blades or vanes carried by the main rotor, and one or more inner blades or vanes carried by the secondary rotor arranged at an angle to the outer blades or vanes to coöperate with the inner pockets of the main rotor.

9. In a rotary engine, the combination of a main rotor provided with a spherical hub, with an outer shell having a spherical inner surface, and with one or more pockets, a secondary rotor mounted on the spherical hub of said main rotor and fitting within the shell thereof, said rotors having surfaces rolling in contact, said secondary rotor having one or more blades or vanes to coöperate with the pockets in the main rotor.

10. In a rotary engine the combination of a main rotor provided with one or more outer pockets and one or more inner pockets and with a spherical bearing surface, a spherical partition and a spherical shell, a secondary rotor mounted on the spherical bearing surface of the main rotor and provided with one or more blades or vanes to coöperate with the outer pockets of the main rotor and with one or more inner blades or vanes to coöperate with the inner pockets of the main rotor.

11. In a rotary engine the combination of a pair of main rotors, a pair of secondary rotors, each rolling in contact with its respective main rotor and coöperating therewith, said secondary rotors being opposed to each other, means to transmit the lateral strain of one secondary rotor to the other secondary rotor, one or more ring shaped compartments between each main rotor and its complementary secondary rotor and one or more blades or vanes for each ring shaped compartment.

12. In a rotary engine the combination of a pair of main rotors, a pair of secondary rotors, each coöperating with its respective main rotor and opposed to each other, means to transmit the lateral strain of one secondary rotor to the other secondary rotor, a plurality of ring shaped compartments between each main rotor and its complementary secondary rotor, and one or more blades or vanes for each ring shaped compartment arranged at an angle to each other.

13. In a rotary engine the combination of a pair of main rotors each provided with a spherical bearing surface and with inner and outer pockets, a pair of secondary conical rotors each of which coöperates with its respective rotor and mounted on the spherical surface of its main rotor, and one or more inner and outer blades or vanes carried by the secondary rotor to coöperate with the inner and outer pockets of the main rotor, and means between the secondary rotors to transmit the lateral strain from one to the other.

14. In a rotary engine the combination of a pair of main rotors each provided with a spherical bearing surface, a spherical partition and a spherical shell, and with inner and outer pockets, a pair of secondary conical rotors each coöperating with its respective main rotor and mounted on the spherical surface of its main rotor and one or more inner and outer blades or vanes carried by the secondary rotor to coöperate with the inner and outer pockets of the main rotor, and means between the secondary rotors to transmit the lateral strain from one to the other.

15. In a rotary engine the combination of a pair of main rotors each provided with a spherical bearing surface, a spherical partition and a spherical shell, and with inner and outer pockets or vanes, a pair of secondary conical rotors, each coöperating with its respective main rotor and mounted on the spherical surface of its main rotor, one or more inner and outer blades or vanes carried by the secondary rotor to coöperate with the inner and outer pockets or vanes of the main rotor, means between the secondary rotors to transmit the lateral strain from one to the other, and means to reverse the direction of the operating fluid to reverse the engine.

16. In a rotary engine the combination of a pair of main rotors, a pair of secondary rotors each coöperating with its respective main rotor and opposed to each other, means to transmit the lateral strain of one secondary rotor to the other secondary rotor, one or more ring shaped compartments between each main rotor and its complementary rotor, one or more blades or vanes for each ring shaped compartment, valves to control the admission of the operating fluid, valve stems, valve shafts, fixed cams, cam followers mounted on the valve shafts, and a clutch for operating the cam followers.

17. In a rotary engine the combination of a pair of main rotors, a pair of secondary rotors each coöperating with its respective main rotor and opposed to each other, means to transmit the lateral strain of one secondary rotor to the other secondary rotor, one or more ring shaped compartments between each main rotor and its complementary secondary rotor, one or more blades or vanes for each ring shaped compartment, valves to control the admission of the operating fluid, valve stems, valve shafts, fixed driving cams, fixed reversing cams, a pair of followers mounted on each drive shaft, one cam follower to coöperate with the fixed drive cams, and one with the fixed reversing cams, and a clutch mounted between the two cam followers and adapted to operate them.

18. In a rotary engine the combination of a pair of main rotors, a pair of secondary rotors each coöperating with its respective main rotor and opposed to each other, means to transmit the lateral strain of one secondary rotor to the other secondary rotor, one or more ring shaped compartments between each main rotor and its complementary secondary rotor, one or more blades or vanes for each ring shaped compartment, valves to control the admission of the operating fluid, valve stems, valve shafts, fixed drive cams, fixed reversing cams, a pair of followers mounted on each drive shaft, one cam follower to coöperate with the fixed drive cams and one with the fixed reversing cams, a clutch mounted between the two cam followers and adapted to operate them, and means to adjust the fixed cams.

19. In a rotary engine the combination of a hollow cylinder, a supply inlet connected to the hollow cylinder, a main rotor mounted on the cylinder, a secondary rotor coöperating with the main rotor, one or more ring shaped compartments between the main and secondary rotors, one or more blades or vanes for each ring shaped compartment, valves for controlling the inlet and exhaust for each ring shaped compartment, connections from the cylinder to each of the valves, and means to operate the valves.

20. In a rotary engine the combination of a hollow cylinder, an inlet connected to the interior of the cylinder, a pair of main rotors mounted on the cylinder, a pair of secondary rotors, each coöperating with its own main rotor and opposed to each other, means between the two secondary rotors to transmit the lateral strain from one to the other, one or more ring shaped compartments between each main rotor and its secondary rotor, and one or more blades or vanes for each ring shaped compartment, valves to control the inlet and exhaust of the different ring-shaped compartments, passages from the cylinder to the different valves, and means to operate the valves to control the admission, exhaust and expansion of the operating fluid.

21. In a rotary engine the combination of a hollow cylinder, an inlet connected to the interior of the cylinder, a pair of main rotors mounted on the cylinder, a pair of secondary rotors, each coöperating with its own main rotor and opposed to each other, means between the two secondary rotors to transmit the lateral strain from one to the other, one or more ring shaped compartments between each main rotor and its secondary rotor, one or more blades or vanes for each ring shaped compartment, valves to control the inlet and exhaust of the different ring shaped compartments, and passages from the cylinder to the different valves, means to operate the valves to control the admission, exhaust and expansion of the operating fluid, valve stems connected to the valves, valve shafts, connections from the valve shafts to the valve stems, fixed drive cams, cam followers mounted on the different valve shafts and means to connect and disconnect the cam follower with its valve shaft to drive or stop the engine.

22. In a rotary engine the combination of a hollow cylinder, an inlet connected to the interior of the cylinder, a pair of main rotors mounted on the cylinder, a pair of secondary rotors each coöperating with its own main rotor and opposed to each other, means between the two secondary rotors to transmit the lateral strain from one to the other, one or more ring shaped compartments between each main rotor and its secondary rotor, one or more blades or vanes for each ring shaped compartment, valves to control the inlet and exhaust of the different ring shaped compartments, passages from the cylinder to the different valves, means to operate the valves to control the admission, exhaust and expansion of the operating fluid, valve stems connected to the valves, valve shafts, connections from the valve shafts to the valve stems, fixed driving cams, fixed reversing cams, two cam followers loosely mounted upon each valve shaft, one cam follower coöperating with the fixed drive cams and one with the fixed reversing cams, and a clutch to connect or disconnect either cam follower with its valve shaft.

23. In a rotary engine, in combination, a main rotor having a conical surface and having at the outer edge of said conical surface a shell having a spherical inner surface, the center of the spherical surface coinciding with the apex of the cone of which the conical surface is a part, and a secondary rotor having a conical surface rolling in contact with the conical surface of the main rotor, said secondary rotor fitting the spherical surface of said main rotor, whereby a closed working chamber is formed between said rotors.

24. In a rotary engine, in combination, a main rotor having a conical surface and having at the outer edge of said conical surface a shell having a spherical inner surface, the center of the spherical surface coinciding with the apex of the cone of which the conical surface is a part, and a secondary rotor having a conical surface rolling in contact with the conical surface of the main rotor, said secondary rotor fitting the spherical surface of said main rotor, whereby a closed working chamber is formed between said rotors, and one or more blades or vanes dividing said chamber radially.

25. In a rotary engine, in combination, a main rotor having a conical surface and having at the outer edge of said conical surface a shell having a spherical inner surface, the center of the spherical surface coinciding with the apex of the cone of which the conical surface is a part, and a secondary rotor having a conical surface rolling in contact with the conical surface of the main rotor, said secondary rotor fitting the spherical surface of said main rotor, whereby a closed working chamber is formed between said rotors, and one or more blades or vanes carried by said main and secondary rotors and extending radially thereof and dividing said working chamber into separate compartments.

26. In a rotary engine, in combination, a main rotor having a conical surface and having at the outer edge of said conical surface a shell having a spherical inner surface, the center of the spherical surface coinciding with the apex of the cone of which the conical surface is a part, said rotor also having a convex spherical bearing surface concentric with the outer spherical bearing surface, but of less radius, and a secondary rotor having a conical surface rolling in contact with the conical surface of the main rotor, said secondary rotor fitting the spherical surfaces of said main rotor, whereby a closed working chamber is formed between said rotors.

27. In a rotary engine, in combination, a main rotor having a conical surface and having at the outer edge of said conical surface a shell having a spherical inner surface, the center of the spherical surface coinciding with the apex of the cone of which the conical surface is a part, said rotor also having a convex spherical bearing surface concentric with the outer spherical bearing surface, but of less radius, and a secondary rotor having a conical surface rolling in contact with the conical surface of the main rotor, said secondary rotor fitting the spherical surfaces of said main rotor, whereby a closed working chamber is formed between said rotors, and one or more blades or vanes carried by said main and secondary rotors and dividing said working chamber into separate compartments.

28. In a rotary engine, in combination, a main rotor having a conical surface and having at the outer edge of said conical surface a shell having a spherical inner surface, the center of the spherical surface coinciding with the apex of the cone of which the conical surface is a part, said rotor also having a convex spherical bearing surface concentric with the outer spherical bearing surface, but of less radius, said main rotor also having a partition midway between said spherical surfaces having concentric inner and outer spherical surfaces, a secondary rotor having two conical bearing surfaces rolling in contact with the conical bearing surface of the first rotor, one of said bearing surfaces contacting with that portion of the conical bearing surface of the main rotor outside of said partition, and the other of said bearing surfaces contacting with the part of the surface of said main rotor inside of said partition, portions of said secondary rotor closely engaging the spherical surfaces of said main rotor, whereby working chambers are formed between the said rotors, and blades or vanes carried by said rotors and dividing said working chambers transversely.

29. In a rotary engine, in combination, a main rotor having a conical surface and having at the outer edge of said conical surface a shell having a spherical inner surface, the center of the spherical surface coinciding with the apex of the cone of which the conical surface is a part, said rotor also having a convex spherical bearing surface concentric with the outer spherical bearing surface, but of less radius, said main rotor also having a partition midway between said spherical surfaces having concentric inner and outer spherical surfaces, a secondary rotor having two conical bearing surfaces rolling in contact with the conical bearing surface of the first rotor, one of said bearing surfaces contacting with that portion of the conical bearing surface of the main rotor outside of said partition, and the other of said bearing surfaces contacting with the part of the conical surface of said main rotor inside of said partition, portions of said secondary rotor closely engaging the spherical surfaces of said main rotor, whereby working chambers are formed between the said rotors, and blades or vanes carried by said rotors and dividing said chambers transversely, the blades or vanes dividing the chamber on one side of said spherical partition being staggered with relation to the blades or vanes on the other side of said partition.

30. In a rotary engine, in combination, a main rotor having a conical surface and having at the outer edge of said conical surface a shell having a spherical inner surface, the center of the spherical surface coinciding with the apex of the cone of which the conical surface is a part, said rotor also having a convex spherical bearing surface concentric with the outer spherical bearing surface, but of less radius, said main rotor also having a partition midway between said spherical surfaces having concentric inner and outer spherical surfaces, a secondary rotor having two conical bearing surfaces rolling in contact with the conical bearing surface of the first rotor, one of said bearing surfaces contacting with that portion of the conical bearing surface of the main rotor outside of said partition, and the other of said bearing surfaces contacting with the part of the conical surface of said main rotor inside of said partition, portions of said secondary rotor closely engaging the spherical surfaces of said main rotor, whereby working chambers are formed between the said rotors, pockets formed in one of said rotors, and blades or vanes pivoted to the other of said rotors crossing said working chambers and sliding in said pockets.

31. In a rotary engine, in combination, a main rotor having a conical surface and having at the outer edge of said conical surface a shell having a spherical inner surface, the center of the spherical surface coinciding with the apex of the cone of which the conical surface is a part, said rotor also having a convex spherical bearing surface concentric with the outer spherical bearing surface, but of less radius, said main rotor also having a partition midway between said spherical surfaces having concentric inner and outer spherical surfaces, a secondary rotor having two conical bearing surfaces rolling in contact with the conical bearing surface of the first rotor, one of said bearing surfaces contacting with that portion of the conical bearing surface of the main rotor outside of said partition, and the other of said bearing surfaces contacting with the part of the conical surface of said main rotor inside of said partition, portions of said secondary rotor closely engaging the spherical surfaces of said main rotor, whereby working chambers are formed between the said rotors, pockets formed in one of said rotors, and blades or vanes pivoted to the other of said rotors crossing said working chambers and sliding in said pockets, the blades or vanes crossing one of said working chambers being staggered with relation to the blades or vanes crossing the other of said working chambers.

32. In a rotary engine, a main rotor mounted on and carried by a shaft and having a conical bearing surface, and a shaftless secondary rotor having a conical bearing surface rolling in contact with said main rotor, and a roller bearing for taking up the thrust of said secondary rotor and supporting the same in contact with said main rotor.

33. In a rotary engine, a main shaft supported at both ends, a main rotor mounted thereon intermediate said ends and having a conical bearing surface, an annular secondary rotor having a conical bearing surface rolling in contact with the surface of said main rotor, said main shaft passing through the central opening of said secondary rotor, and a roller bearing supporting said secondary rotor and retaining the same in position.

34. In a rotary engine, a main shaft supported at both ends, a main rotor mounted thereon intermediate said ends and having a conical bearing surface and a central convex spherical bearing surface, an annular secondary rotor mounted on said spherical surface and having a conical surface rolling in contact with the conical bearing surface of said main rotor, and a roller bearing supporting said secondary rotor and maintaining the same in such position that its conical surface shall roll upon the conical surface of the main rotor.

35. In a rotary engine, a main shaft, a main rotor mounted thereon having a conical bearing surface and concentric, convex and concave spherical bearing surfaces, the centers of which coincide with the apex of the cone of which the conical bearing surface is a part, a secondary rotor having a conical bearing surface rolling in contact with the conical bearing surface of said main rotor and having portions fitting said convex and concave spherical bearing surfaces, whereby a working chamber is formed between said main and secondary rotors, and a roller bearing for supporting said secondary rotor in position.

36. In a rotary engine, a main shaft, a pair of main rotors mounted thereon having conical bearing surfaces, the apices of which face each other, a pair of secondary rotors having conical surfaces rolling in contact with the conical surfaces of said main rotors, and a roller bearing interposed between said secondary rotors.

37. In a rotary engine, a main shaft, a pair of main rotors mounted thereon having conical bearing surfaces, the apices of which face each other, a pair of secondary rotors having conical surfaces rolling in contact with the conical surfaces of said main rotors, said secondary rotors having adjacent conical faces rolling in contact along one element and conical bearing rollers engaging said faces along other elements.

38. In a rotary engine, a main shaft, a pair of main rotors mounted thereon having conical bearing surfaces facing each other and having concentric, convex and concave spherical bearing surfaces whose centers coincide with the apices of the cones of which said conical bearing surfaces form parts, a pair of secondary rotors having conical bearing surfaces rolling in contact with the conical bearing surfaces of said main rotors, and having portions fitting said spherical bearing surfaces, said secondary rotors having adjacent conical bearing surfaces, and rollers interposed between said bearing surfaces.

39. In a rotary engine, a main shaft, a pair of main rotors mounted thereon having conical bearing surfaces facing each other and having concentric, convex and concave spherical bearing surfaces whose centers coincide with the apices of the cones of which said conical bearing surfaces form parts, a pair of secondary rotors having conical bearing surfaces rolling in contact with the conical bearing surfaces of said main rotors, and having portions fitting said spherical bearing surfaces, said secondary rotors having adjacent conical bearing surfaces, said bearing surfaces rolling in contact along one element, and rollers interposed between other parts of said bearing surfaces.

40. In a rotary engine, in combination, a main rotor having a conical bearing surface and an inclosing shell having a spherical inner surface, a secondary rotor having a conical surface rolling in contact with the conical surface of said main rotor and having a portion fitting said spherical surface, one of said rotors being movable toward and from the other rotor, and means permitting the motor operating fluid to act upon one of said rotors to force the same toward the other rotor and maintain the conical surface of said rotor in contact.

41. In a rotary engine, in combination, a rotatable member, a plurality of rotors having surfaces rolling in contact, one of said rotors being mounted upon said member and having a limited longitudinal movement thereon, a flange secured to said rotor, a flange secured to said rotatable member, and means for admitting the operating fluid between said flanges.

42. In a rotary engine, in combination, a rotatable member, a plurality of main rotors mounted thereon, one of said rotors being fixed thereto, and the other rotor having a limited longitudinal movement thereon, said rotors having conical bearing surfaces facing each other, a pair of secondary rotors located between said main rotors, each of said secondary rotors having a conical surface rolling in contact with the conical surface of its main rotor, said secondary rotors reacting against each other, and means for adjusting the position of said movable main rotor upon said rotatable member.

43. In a rotary engine, in combination, a rotatable member, a plurality of main rotors mounted thereon, one of said rotors being fixed thereto, and the other rotor having a limited longitudinal movement thereon, said rotors having conical bearing surfaces facing each other, a pair of secondary rotors located between said main rotors, each of said secondary rotors having a conical surface rolling in contact with the conical surface of its main rotor, said secondary rotors reacting against each other, and means controlled by the pressure of the operating fluid for urging said movable main rotor toward said fixed main rotor.

44. In a rotary engine, in combination, a rotatable member, a plurality of main rotors mounted thereon, one of said rotors being fixed thereto, and the other rotor having a limited longitudinal movement thereon, said rotors having conical bearing surfaces facing each other, a pair of secondary rotors located between said main rotors, each of said secondary rotors having a conical surface rolling in contact with the conical surface of its main rotor, said secondary rotors reacting against each other, a flange carried by said movable main rotor, a flange carried by said rotatable member, and means for admitting the operating fluid between said flanges.

45. In a rotary engine, in combination, a rotatable member, a plurality of main rotors mounted thereon, one of said rotors being fixed thereto, and the other rotor having a limited longitudinal movement thereon, said rotors having conical bearing surfaces facing each other, a pair of secondary rotors located between said main rotors, each of said secondary rotors having a conical surface rolling in contact with the conical surface of its main rotor, a roller bearing interposed between said secondary rotors, and means controlled by the pressure of the operating fluid for urging said movable main rotor toward said fixed main rotor.

46. In a rotary engine, in combination, a rotatable member, a plurality of main rotors mounted thereon, one of said rotors being fixed thereto, and the other rotor having a limited longitudinal movement thereon, said rotors having conical bearing surfaces facing each other, a pair of secondary rotors located between said main rotors, each of said secondary rotors having a conical surface rolling in contact with the conical surface of its main rotor, said secondary rotors having other conical surfaces rolling in contact with each other, and means controlled by the pressure of the operating fluid for urging said movable main rotor toward said fixed main rotor.

47. In a rotary engine, a main shaft, a pair of main rotors mounted thereon having conical bearing surfaces, the apices of which face each other, a pair of secondary rotors having conical surfaces rolling in contact with the conical surfaces of said main rotors, said secondary rotors having adjacent conical faces rolling in contact.

48. In a rotary engine, a main shaft, a pair of main rotors mounted thereon having conical bearing surfaces, the apices of which face each other, a pair of secondary rotors having conical surfaces rolling in contact with the conical surfaces of said main rotors, and a roller bearing interposed between said secondary rotors, said bearing comprising a double series of rollers, the rollers of the two series rolling in contact, and the rollers of each series rolling in contact with one of said rotors.

49. In a rotary engine, a main shaft, a pair of main rotors mounted thereon having conical bearing surfaces, the apices of which face each other, a pair of secondary rotors having conical surfaces rolling in contact with the conical surfaces of said main rotors, said secondary rotors having their conical bearing surfaces facing each other, and a roller bearing interposed between said second conical bearing surfaces, said bearing comprising a double series of conical rollers, the rollers of the two series being arranged in pairs, the rollers of each pair rolling in contact with each other, and one roller of each pair rolling in contact with one of said second conical surfaces.

50. In a rotary engine, in combination, a pair of rotors having conical surfaces rolling in contact, a shell inclosing the space between the conical surfaces of said rotors, a pocket in one of said rotors, a rigid vane working in said pocket and bridging the space between said rotors, and means for connecting said vane to the second of said rotors, said means permitting pivotal and limited bodily lateral movement of said vane with relation to the conical surface of said second rotor.

51. In a rotary engine, in combination, a pair of rotors having conical surfaces rolling in contact, a shell inclosing the space between the conical surfaces of said rotors, a pocket in one of said rotors, a vane working in said pocket, and means for connecting said vane to the second of said rotors, said means comprising a link pivoted to said vane and to said rotor.

52. In a rotary engine, in combination, a pair of rotors having conical surfaces rolling in contact, a spherical shell inclosing the space between said conical surfaces, the center of said spherical shell and the apices of the cones of which said conical surfaces are parts coinciding, a pocket formed in one of said rotors and located in a plane passing through the axis of rotation of said rotor, a vane working in said pocket, and means for connecting said vane to the second of said rotors, said means comprising a link pivoted at one end to said vane and at the other end to said rotor, the axes of said pivots passing through the apex of the cone of which the conical bearing surface of said rotor is a part.

53. In a rotary engine, in combination, a pair of rotors having conical surfaces rolling in contact, a spherical shell inclosing the space between said conical surfaces, the center of said spherical shell and the apices of the cones of which said conical surfaces are parts coinciding, a pocket formed in one of said rotors and located in a plane passing through the axis of rotation of said rotor, a vane working in said pocket, and means for connecting said vane to the second of said rotors, said means comprising a link pivoted at one end to said vane and at the other end to said rotor, the axes of said pivots passing through the apex of the cone of which the conical bearing surface of said rotor is a part, and means for preventing leakage between said vane and the conical bearing surface of said rotor.

54. In a rotary engine, in combination, a pair of rotors having conical surfaces rolling in contact, a spherical shell inclosing the space between said conical surfaces, the center of said spherical shell and the apices of the cones of which said conical surfaces are parts coinciding, a pocket formed in one of said rotors and located in a plane passing through the axis of rotation of said rotor, a vane working in said pocket, means for connecting said vane to the second of said rotors, said means comprising a link pivoted at one end to said vane and at the other end to said rotor, the axes of said pivots passing through the apex of the cone of which the conical bearing surface of said rotor is a part, and means for preventing leakage between said vane and the conical bearing surface of said rotor, said means comprising the floating packing member 60 having a convex cylindrical surface engaging a concave cylindrical surface formed in the end of the vane and having a concave conical surface engaging a convex conical projection formed on the bearing surface of the rotor.

55. In a rotary engine, the combination with a spherical shell, of a pair of rotors having surfaces rolling in contact, the space between said rotors and shell being divided into two concentric annular working chambers by a spherical partition carried by one of said rotors and working in an annular recess in the other rotor, and blades or vanes carried by said rotors in each of said annular chambers.

56. In a rotary engine, the combination with a spherical shell, of a pair of rotors having surfaces rolling in contact, the space between said rotors and shell being divided into two concentric annular working chambers by a spherical partition carried by one of said rotors and working in an annular recess in the other rotor, and blades or vanes carried by said rotors in each of said annular chambers, the blades or vanes in one chamber being located at different circumferential points from the blades or vanes in the other chamber.

FRANS IVAR L. BYLGER.

Witnesses:
CHS. KRUSE,
M. J. ANDRADA.

Copies of this patent may be obtained for five cents each, by addressing the "Commissioner of Patents, Washington, D. C."